(12) United States Patent
Huang

(10) Patent No.: US 7,926,629 B2
(45) Date of Patent: Apr. 19, 2011

(54) HANDLE OF ELECTROMAGNETIC BRAKE

(75) Inventor: Hung Ping Huang, Shengang Shiang (TW)

(73) Assignee: Ya Cheng Electrical Engineering Co., Ltd., Taichung County (TW)

( * ) Notice: Subject to any disclaimer, the term of this patent is extended or adjusted under 35 U.S.C. 154(b) by 711 days.

(21) Appl. No.: 11/709,608

(22) Filed: Feb. 22, 2007

(65) Prior Publication Data

US 2008/0202872 A1 Aug. 28, 2008

(51) Int. Cl.
*B60T 13/04* (2006.01)

(52) U.S. Cl. ........ 188/171; 188/158; 188/161; 188/163; 188/216

(58) Field of Classification Search .................. 188/171, 188/173, 72.3, 156, 158, 161–163, 216; 310/77, 310/93; 192/90
See application file for complete search history.

(56) References Cited

U.S. PATENT DOCUMENTS

| 4,265,687 | A | * | 5/1981 | Mercer et al. ................. 156/73.1 |
| 4,538,712 | A | * | 9/1985 | Nagai ......................... 192/18 R |
| 4,820,946 | A | * | 4/1989 | Gutbrod .......................... 310/77 |
| 4,966,255 | A | * | 10/1990 | Fossum ......................... 188/71.8 |
| 5,685,398 | A | * | 11/1997 | Marshall et al. ............. 188/171 |
| 5,915,507 | A | * | 6/1999 | Maurice et al. ............... 188/171 |
| 6,119,825 | A | * | 9/2000 | Nisley ............................ 188/171 |
| 6,125,975 | A | * | 10/2000 | Seeto et al. .................... 188/171 |
| 6,412,613 | B1 | * | 7/2002 | Lu .................................. 188/171 |
| 6,536,563 | B1 | * | 3/2003 | Schlehbusch et al. ........ 188/161 |
| 6,543,587 | B1 | * | 4/2003 | Albrecht ....................... 188/171 |
| 6,675,940 | B2 | * | 1/2004 | Maurice ........................ 188/171 |

* cited by examiner

*Primary Examiner* — Robert A Siconolfi
*Assistant Examiner* — Mariano Sy
(74) *Attorney, Agent, or Firm* — Pro-Techtor Int'l Services; Ralph Willgohs

(57) ABSTRACT

An electromagnetic brake includes a housing, a pin, brake springs urged against the pin, a handle pivotably secured to the pin, a coil, a moveable armature plate, a moveable friction disc, a trigger switch on the housing and including a projecting contact and a pivotal trigger, steel balls in the half holes of the housing and the handle, and a rod fixedly projecting out of a slot of the handle. In a brake released position, the rod is at one end of the slot with the coil being energized. The handle is adapted to pivot to move the other end of the slot to engage with the rod, the handle contacts and pivots the trigger to enable the trigger switch so as to de-energize the coil, and the springs apply an expansion force to urge against the pin for causing the friction disc to apply brake to a shaft.

1 Claim, 6 Drawing Sheets

HANDLE OF ELECTROMAGNETIC BRAKE

BACKGROUND OF THE INVENTION

1. Field of Invention

The invention relates to electromagnetic brakes and more particularly to an electromagnetic brake used for electric walker, the electromagnetic brake having an improved handle which is produced in a simple process without involving of soldering so as to greatly reduce the manufacturing cost.

2. Description of Related Art

There have been numerous suggestions in prior patents for electromagnetic brake. For example, U.S. Pat. No. 4,820,946 discloses an electromagnetic brake in which there is provided a single mechanism capable of both adjusting the brake spring force and the releasing the brake spring force entirely when necessary.

In addition, a conventional electromagnetic brake is shown in FIGS. 1, 2 and 3. The electromagnetic brake comprises a cylindrical housing 10 including a pin 12 and a brake spring (e.g., coil spring) 11 put on the shank of the pin 12. A handle 13 is provided on a top of the housing 10. The handle 13 comprises on its top a substantially disc shaped member 132 and a staged hole (not numbered) on a center. A washer 14 is snugly placed in the hole of the disc shaped member 132. A screw 15 is fastened through a central threaded hole (not numbered) of the washer 14 into a threaded hole (not numbered) of the shank of the pin 12 to pivotably secure the handle 13 to the housing 10 with the spring 11 being compressed between the enlarged head of the pin 12 and a top of an internal compartment of the housing 10. As such, the handle 13 is pushed outwardly by the expansion force of the spring 11. A coil 150 in the form of a ring is provided in the housing 10. A disc shaped armature plate 16 moveably provided under the coil 150 comprises six equally spaced recesses 161 along a peripheral edge. A disc shaped bottom plate 18 has a central opening (not numbered) and six equally spaced through holes (not numbered) between a peripheral edge and the opening. A plurality of (e.g., three) screws 17 are driven through the plate 18 and the recesses 161 into the housing 10 for slidably fastening the components disposed between the plate 18 and the coil 150 as detailed later. A friction disc 19 having a central opening (not numbered) is provided between the armature plate 16 and the plate 18. The friction disc 19 is operatively connected to a drive means (e.g., shaft of a motor (not shown)) to effect a braking. In a brake released operation, electric voltage is applied to the coil 150 to generate a magnetic field to attract the armature plate 16. As such, the armature plate 16 is disengaged with the friction disc 19. The friction disc 19 is free and the brake is thus released. A user may further pivot the handle 13 to enable a trigger switch 131 provided on top of the housing 10 proximate an edge of the disc shaped member 132. The enabled trigger switch 131 thus causes the electromagnetic brake to apply the brake.

As shown in FIG. 2, a plurality of steel balls 134 are rotatably sandwiched between half holes (not numbered), e.g. arcuate grooves as shown in FIG. 1, of the handle 13 and half holes (not numbered) of the disc shaped member 132. However, a precise alignment between the respective half holes is required. Otherwise, the desired rotation capability of the steel balls 134 can not be achieved. It is typical of securing the disc shaped member 132 onto the handle 13 by soldering. However, the soldering is a troublesome, time consuming process.

As shown in FIG. 3, a maximum pivotal angle of the handle 13 is about 15 degrees as defined by two adjacent rods 101 projecting from the top of the housing 10. When the handle 13 is pivoted about 15 degrees relative to its other operation point (as indicated by dashed lines), the contact 1311 of the trigger switch 131 is aligned with an indentation 133 at an edge of the handle 13. Thus, the trigger switch 131 is disabled. A further pivoting of the handle 13 will cause its edge to contact the contact 1311 of the trigger switch 131. And in turn, the trigger switch 131 is enabled to cut off the power. As a result, the coil 15 is not energized, resulting in a brake applying of the electromagnetic brake.

However, the well known electromagnetic brake suffered from several disadvantages. For example, both the disc shaped member 132 and the handle 13 are required. Further, their half holes are required to be precisely aligned when they are assembled. Hence, the manufacturing processes are complicated. Moreover, the disc shaped member 132 and the handle 13 are separate members prior to soldering together. Thus, more materials are consumed in the manufacturing processes. Further, high precision is required, resulting in an increase in the manufacturing cost.

Thus, it is desirable to provide an improved handle of electromagnetic brake in order to overcome the drawbacks of the prior art.

SUMMARY OF THE INVENTION

It is therefore one object of the invention to provide an electromagnetic brake having an one-piece handle which is produced in a simple process without involving of soldering so as to greatly reduce the manufacturing cost.

The above and other objects, features and advantages of the invention will become apparent from the following detailed description taken with the accompanying drawings.

DETAILED DESCRIPTION OF THE INVENTION

Figure 1:
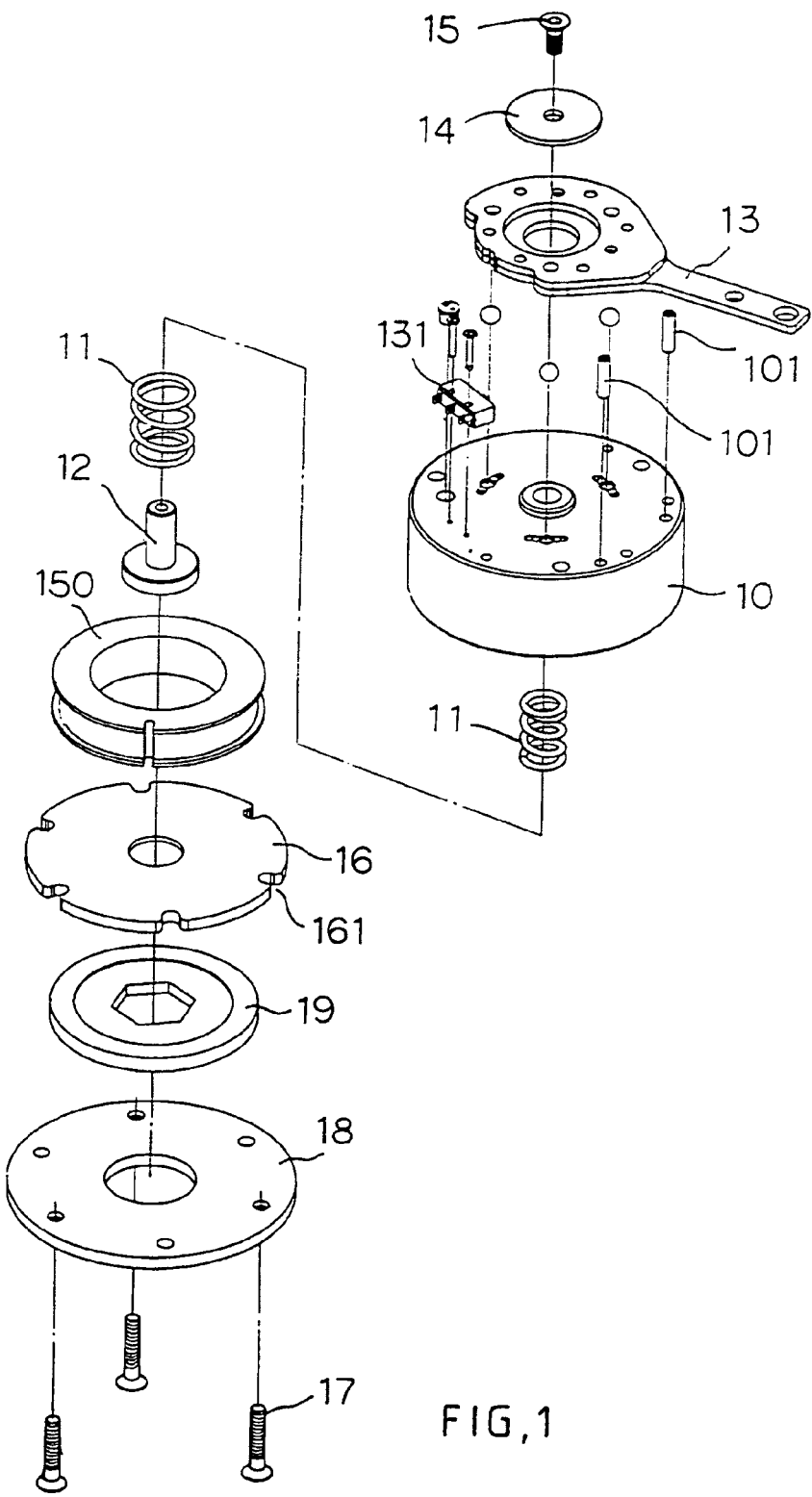
FIG. 1 is an exploded view of a conventional electromagnetic brake.
Figure 2:
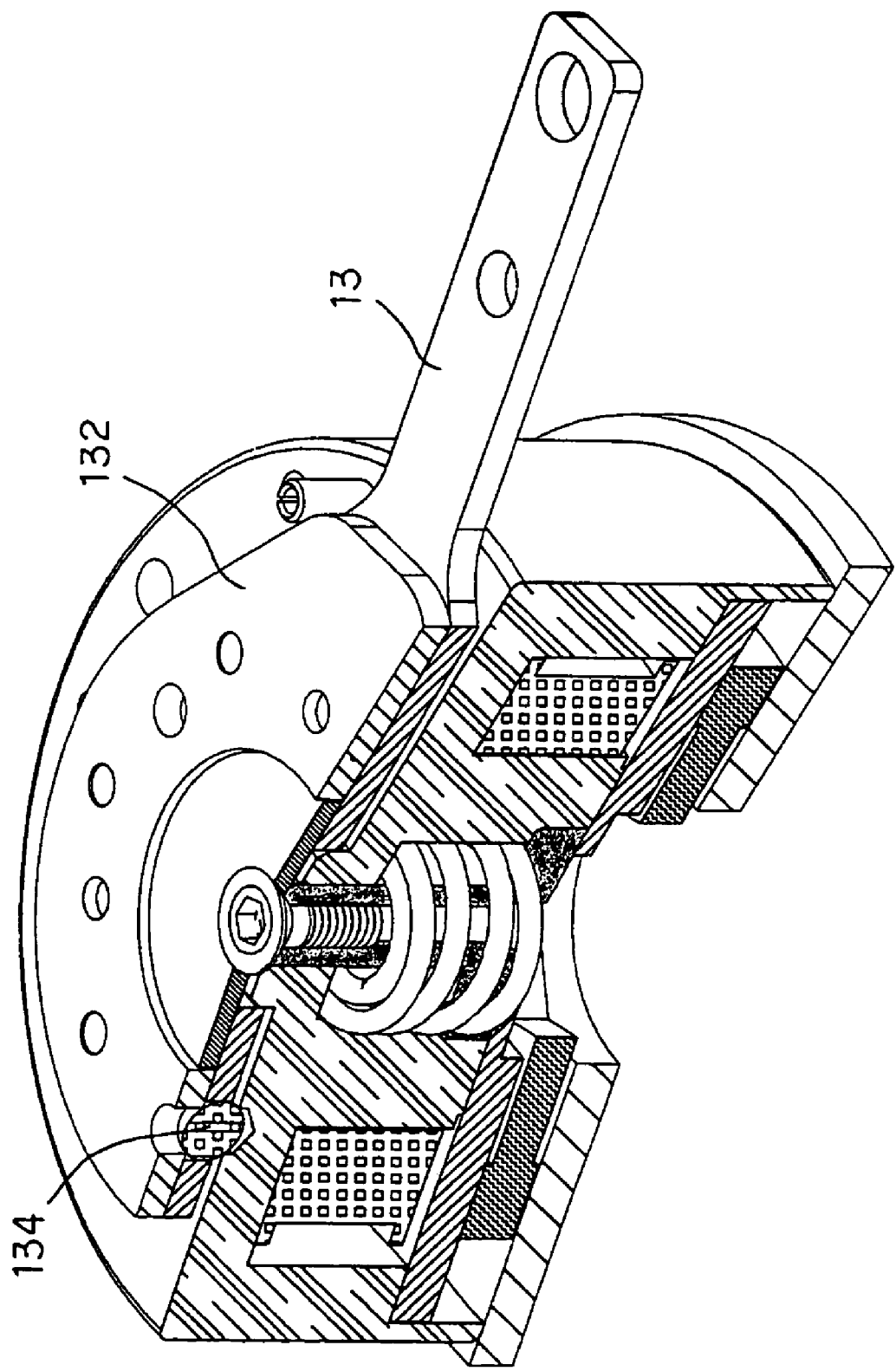
FIG. 2 is a sectional view of the assembled electromagnetic brake of FIG. 1.
Figure 3:
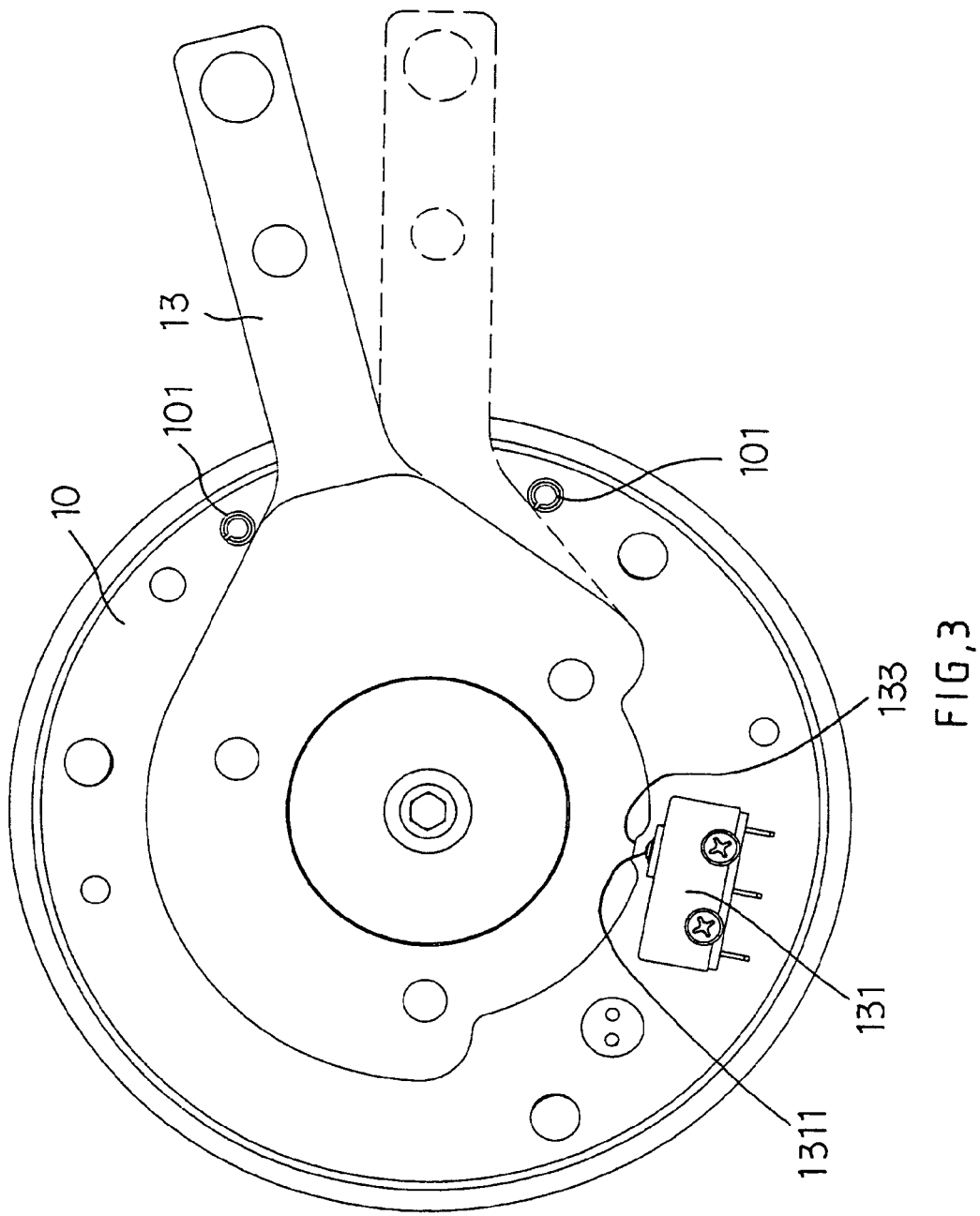
FIG. 3 is a top view of the assembled electromagnetic brake of FIG. 1 for showing its brake applying and brake releasing operations.
Figure 4:
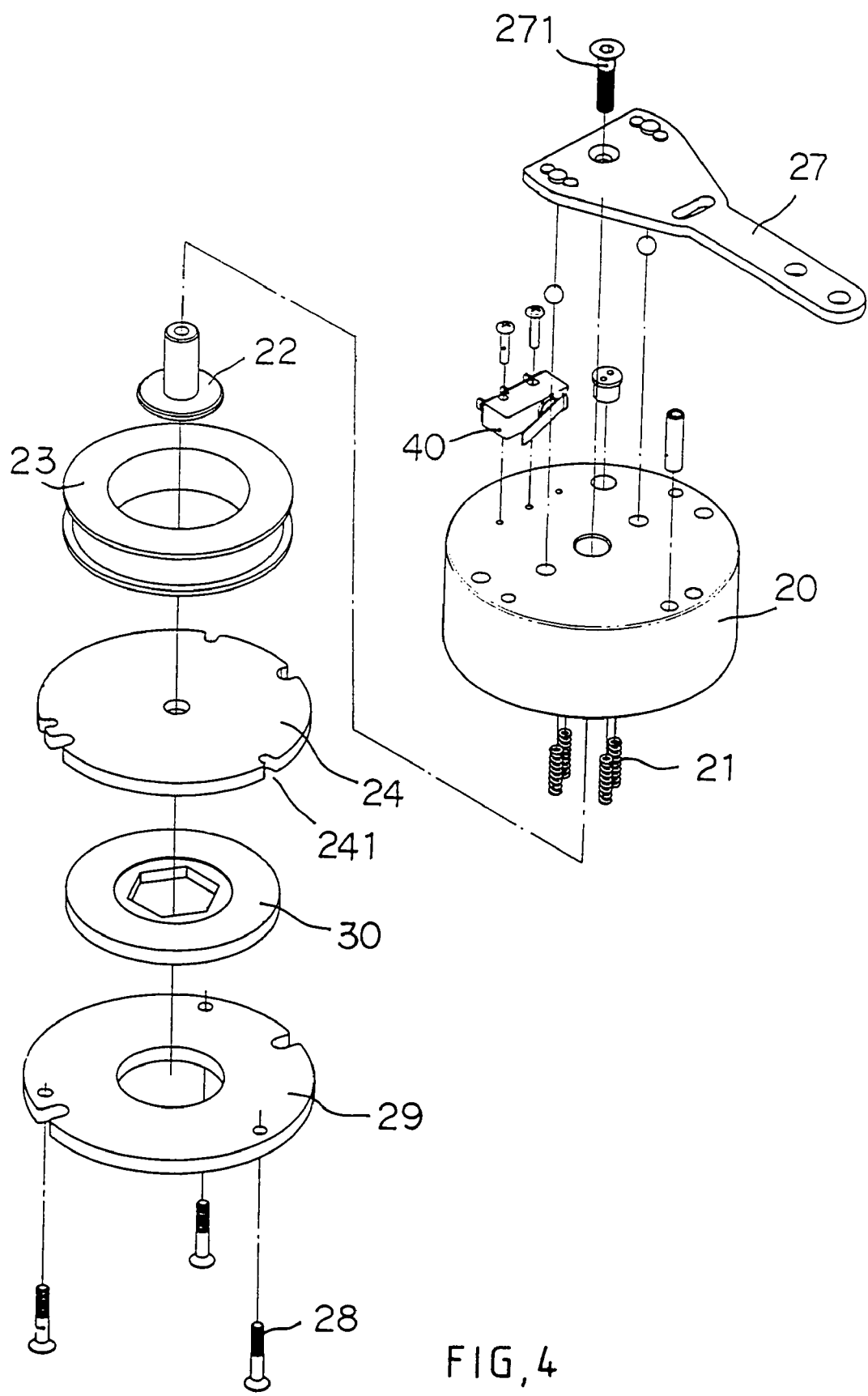
FIG. 4 is an exploded view of a preferred embodiment of electromagnetic brake according to the invention.
Figure 5:
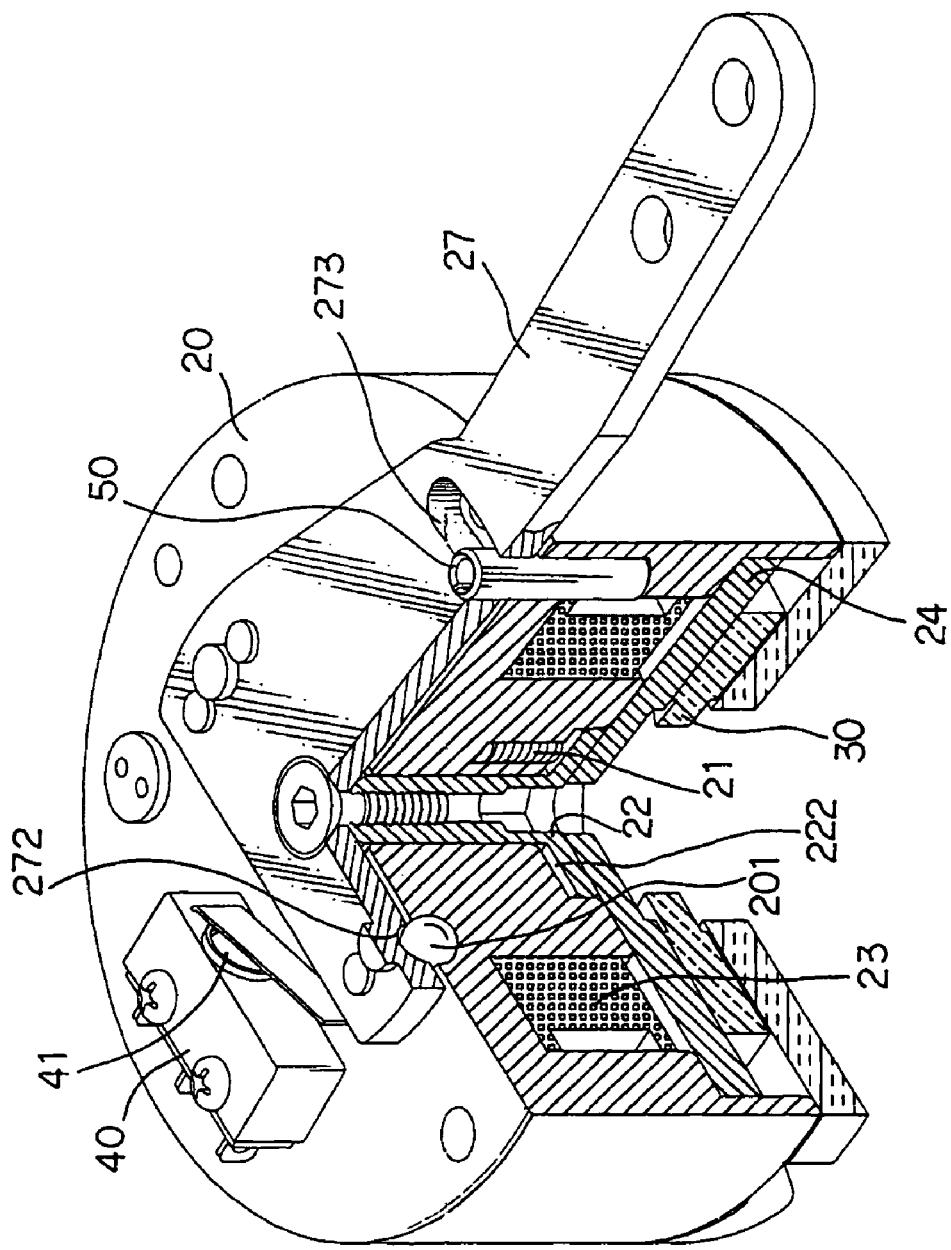
FIG. 5 is a sectional view of the assembled electromagnetic brake of FIG. 4.
Figure 6:
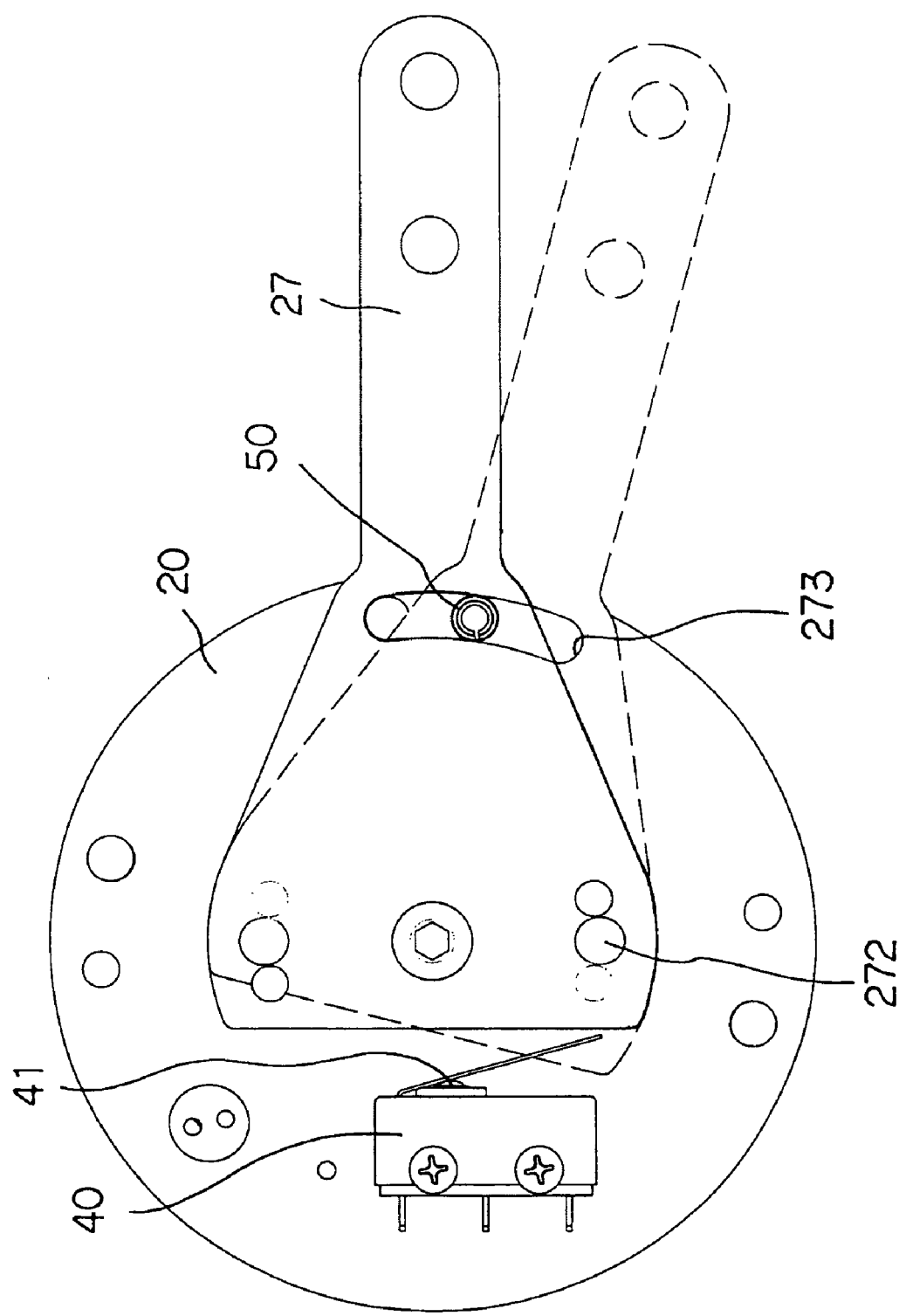
FIG. 6 is a top view of the assembled electromagnetic brake of FIG. 4 for showing its brake applying and brake releasing operations.

Referring to FIG. 4, an electromagnetic brake in accordance with a preferred embodiment of the invention comprises a cylindrical housing 20 including a pin 22 having an enlarged head provided proximate a bottom of the housing 20, a plurality of (e.g., four) internal brake springs (e.g., coil springs) 21, and a handle 27 pivotably attached on a top of the housing 20 as detailed later. The handle 27 includes a central hole (not numbered) and a fastener, e.g. a screw, 271 through the central hole into a threaded hole (not numbered) of the shank of the pin 22 to fasten the handle 27 to the pin 22, and thereby to pivotably secure the handle 27 onto the housing 20, with the springs 21 equally spaced around the pin 22 being compressed between the head of the pin 22 and a top of an internal compartment of the housing 20, and with a space 222 provided between the head of the pin 22 and a lower surface of the housing 20 as shown in FIG. 5. The handle 27, in a preferred embodiment is of one-piece and continuous, as shown in FIGS. 4 & 5, and further comprises two opposite bottom half holes 272 with the ball 201 disposed therebetween, and a curved slot 273 proximate an edge of the housing 20.

A coil 23 in the form of a ring is provided in the housing 20. A disc shaped armature plate 24 moveably provided under the coil 23 and engaged with the head of the pin 22 comprises a plurality of spaced recesses 241 along an edge. A disc shaped bottom plate 29 has a central opening (not numbered) and a plurality of equally spaced through holes (not numbered) proximate an edge. A plurality of (e.g., three) screws 28 are driven through the holes of the plate 29 and the recesses 241 into the housing 20 for slidably fastening components disposed between the plate 29 and the coil 23 as detailed below. Thus, the armature plate 24 is confined to move upwardly or downwardly by the guiding of the screws 28. A friction disc 30 having a central opening (not numbered) is provided between the armature plate 24 and the plate 29. The friction disc 30 is operatively connected to a drive means (e.g., shaft of a motor (not shown)) to effect a braking.

A trigger switch 40 is provided on the top of the housing 20 and comprises a projecting contact 41 facing the handle 27, and a plate shaped, elongate pivotal trigger (not numbered) obliquely extending from a position proximate the contact 41 toward one side of the handle 27.

A plurality of steel balls 201 are rotatably sandwiched between the half holes 272 of the handle 27 and half holes (not numbered) on the top of the housing 20. The half holes 272 are formed directly when the handle 27 is manufactured by molding. Thus, the manufacturing processes of the handle 27 are much simple without involving of soldering with cost reduction as compared with the prior art.

The expansion force of the springs 21 pushes down the pin 22 which in turn pushes down both the armature plate 24 and the friction disc 30 for forming brake applying and brake releasing mechanisms of the electromagnetic brake as known in the art.

A rod 50 fixedly secured to the housing 20 projects out of the slot 273. A maximum pivotal angle of the handle 27 in its pivoting operation is set about 15 degrees by two ends of the slot 273. The coil 23 is energized to generate a magnetic field to attract the armature plate 24 as electric voltage is applied thereto. As such, the armature plate 24 is disengaged with the friction disc 30. The friction disc 30 is free and the brake is thus released (i.e., the motor shaft continues to rotate).

A user may pivot the handle 27, for example, to move one end of the slot 273 to engage with the rod 50 at the other end thereof (as indicated by dashed lines) so as to press the trigger by the front end of the handle 27. The trigger thus pivots about the trigger switch 40 to contact the contact 41. The trigger switch 40 thus is enabled to cut off the power. As such, the coil 23 is not energized. And in turn, the compression force of the springs 21 urges against the pin 22 which in turn presses down both the armature plate 24 and the friction disc 30. As a result, a brake applying of the electromagnetic brake is done.

While the invention herein disclosed has been described by means of specific embodiments, numerous modifications and variations could be made thereto by those skilled in the art without departing from the scope and spirit of the invention set forth in the claims.

What is claimed is:

1. An electromagnetic brake comprising:
  a housing including two opposite top half holes; a pin mounted in the housing;
  a plurality of brake springs mounted in the housing for urging against a head of the pin;
  a handle of one continuous piece, mounted on a top of the housing and pivotably connected thereto, being secured to a shank of the pin by a fastener, the handle including two opposite bottom half holes with the pin disposed therebetween, and a slot proximate an edge of the housing; a coil mounted in the housing;
  an armature plate moveably mounted under the coil and engaged with the head of the pin;
  a plate member secured to a bottom of the housing;
  a friction disc moveably mounted between the armature plate and the plate member, the friction disc being operatively connected to a rotatable shaft of a load;
  a trigger switch mounted on the top of the housing and including a projecting contact facing the handle, and a pivotal trigger obliquely extending from a position proximate the contact toward one side of the handle;
  a plurality of steel balls rotatably sandwiched between the half holes of the handle and the half holes of the housing; and
  a rod fixedly secured to the housing and projecting out of the slot, wherein the rod is disposed at one end of the slot when the electromagnetic brake is in a brake released position;
  wherein the coil is adapted to energize to magnetically attract the armature plate to compress the springs and disengage the friction disc for releasing the shaft of the load; and
  wherein the handle is adapted to pivot to move the other end of the slot to engage with the rod, the handle contacts and pivots the trigger to enable the trigger switch so as to de-energize the coil and reject the armature plate, the springs apply an expansion force to urge against the pin, and the in presses down both the armature plate and the friction disc for applying brake to the shaft of the load;
  further comprising a space provided between the head of the pin and a lower surface of the housing, whereby the pin is axially moveable relative to the housing.

* * * * *